(12) United States Patent
Venkata Naga Ravi

(10) Patent No.: US 10,409,643 B2
(45) Date of Patent: Sep. 10, 2019

(54) SERVICE REQUEST BASED APPLICATION FEATURE ACTIVATION

(71) Applicant: Oracle International Corporation, Redwood Shores, CA (US)

(72) Inventor: Kiran Vedula Venkata Naga Ravi, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 225 days.

(21) Appl. No.: 15/692,111

(22) Filed: Aug. 31, 2017

(65) Prior Publication Data
US 2019/0065259 A1 Feb. 28, 2019

(51) Int. Cl.
*G06F 9/50* (2006.01)
*G06F 3/01* (2006.01)
*G06F 3/0482* (2013.01)

(52) U.S. Cl.
CPC .......... *G06F 9/5005* (2013.01); *G06F 3/01* (2013.01); *G06F 3/0482* (2013.01); *G06F 2209/5013* (2013.01)

(58) Field of Classification Search
None
See application file for complete search history.

(56) References Cited

U.S. PATENT DOCUMENTS

| 8,737,981 | B2* | 5/2014 | Jacobs | H04M 1/72525 455/419 |
| 9,489,177 | B2* | 11/2016 | Koretz | G06F 8/00 |
| 2012/0321539 | A1* | 12/2012 | Steen | B01D 53/501 423/243.01 |
| 2017/0192767 | A1* | 7/2017 | Choudhari | G06F 9/44505 |
| 2018/0260541 | A1* | 9/2018 | Riscutia | H04L 9/08 |
| 2018/0314548 | A1* | 11/2018 | Gopal | G06F 9/4881 |

* cited by examiner

*Primary Examiner* — Natisha D Cox
(74) *Attorney, Agent, or Firm* — Invoke

(57) ABSTRACT

Operations include selectively presenting application features to a service request interface. A service request interface may present service request data to an agent. The service request data may be used by the agent to process the service request. Based on the service request data, the system identifies application features which would be useful to the agent in processing the service request. The application features may be presented in the form of a set of toolbars customized for a particular kind of service request. The toolbars may be refined and restructured using a heuristic machine-learning model. The presence of a particular application feature may be reinforced or weakened based on factors such as frequency of use.

20 Claims, 7 Drawing Sheets

SERVICE REQUEST BASED APPLICATION FEATURE ACTIVATION

TECHNICAL FIELD

The present disclosure relates to service request processing. In particular, the present disclosure relates to activating application features based on the service request that is being processed by an agent.

BACKGROUND

A service request is a request, submitted by a user, for goods, services, or changes thereof. The service request may be a request for information, advice, a change, or for access. As an example, a service request may be a request for information or services related to computer software. A user may submit a service request for assistance managing the user's bank account on a website. A service request may be a request to receive or repair hardware. As an example, a user may submit a service request for the air conditioning in the user's office to be repaired. A service request may or may not include detailed information describing a problem to be solved and/or a service to be performed.

Commonly, a customer service agent handles a service request. A customer service agent may be trained to handle a specific type of service request. It is increasingly common for one customer service agent to handles various different types of service requests with the help of on-line tools. The customer service agent may search numerous systems to find the correct on-line tools that are appropriate for a particular kind of service request.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
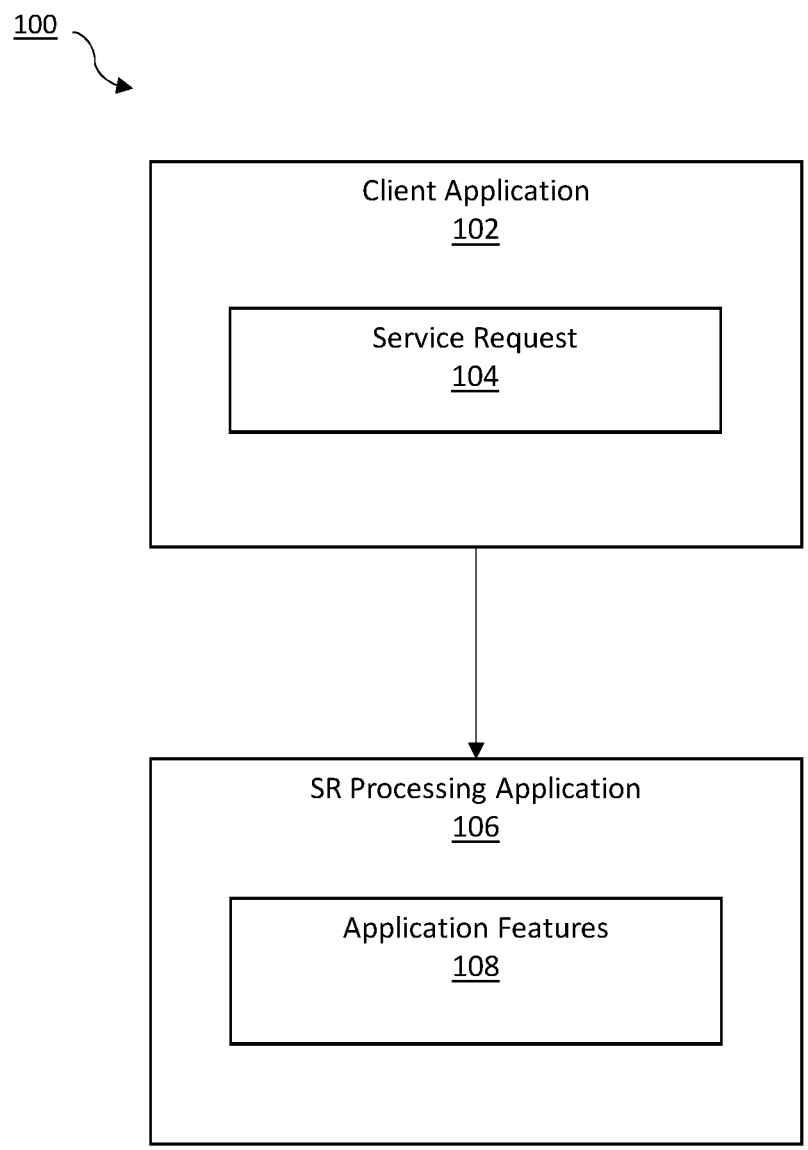
FIG. 1 illustrates a service request processing system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. APPLICATION FEATURE ACTIVATION SYSTEM
3. SELECTIVELY ACTIVATING APPLICATION FEATURES
4. MACHINE-LEARNING MODEL
5. SERVICE REQUEST TOOLBAR
6. MISCELLANEOUS; EXTENSIONS
7. HARDWARE OVERVIEW

1. General Overview

A service request processing application may present a service request to an agent. Presenting the service request may include presenting data associated with the service request (hereinafter "service request data"). The agent processes the service request based on the service request data. The agent may require the use of one or more application features to process the service request.

One or more embodiments include selectively activating application features of a service request (SR) processing application. The system determines a context associated with a service request ("hereinafter service request context") based on service request data. Determining the service request context may include determining that the service request data includes values of a particular data type or service request attribute. A set of data types or service request attributes define a service request context. The system identifies and activates application features, based on the service request context, which are likely to be useful to the agent in processing the service request.

An application feature may correspond to a functionality of an application. As an example, an application feature may be an online resource for purchasing airline tickets. As another example, an application feature may link to a purchasing application for ordering a new computer monitor. An application feature may be presented as a toolbar or a component of a toolbar that is useful for processing a service request.

The system may activate an application feature by presenting an interface element (e.g., a button, an icon, a link, a toolbar, a toolbar component) corresponding to the application feature. Presenting an interface element corresponding to the application feature may be referred to herein as presenting the application feature or activating the application feature. The system may activate an application feature by removing access restrictions corresponding to the application feature. The system may activate an application feature improving a speed or efficiency with which an agent can access the application feature.

In one or more embodiments, the application features are selected for presentation using a heuristic machine-learning model. A particular application feature may be selected for presentation in a service request context based frequency of prior use in the service request context. The system may assign a weight to a feature. The system may base the selection of one or more application features, for presentation, on the weight associated with the corresponding application features.

One or more embodiments described in this Specification and/or recited in the claims may not be included in this General Overview section.

2. Application Feature Activation System

FIG. 1 illustrates a service request (SR) processing system 100 in accordance with one or more embodiments. A service request processing system 100 transmits service request data between a client application 102 and an SR processing application 106. In one or more embodiments, the service request processing system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a service request 104 is a request, submitted by a user, for goods, services, or changes thereof. The service request may be a request for information, advice, a change, or for access. A service request may be related to software or hardware. As an example, a service request may be a request for information or services related to a webpage. A user may submit a service request for assistance managing the user's bank account on a website. A service request may be a request to receive or repair hardware. As an example, a user may submit a service request for the air conditioning in the user's office to be repaired.

A service request may or may not include detailed information describing a problem to be solved and/or a service to be performed. Any information that is included in a service request 104 may be referred to herein as "service request data." Service request data may include text, images, audio, video, or a combination thereof. Service request data may include structured information that is formatted according to a particular template, or submitted via a fixed set of fields in an online interface. Service request data may include unstructured information that does not match any particular format, or template.

As an example, service request data may include the text "My printer is broken." Alternatively, or additionally, service request data may include the text "I need help making a spreadsheet." As another example, the service request data may include a verbal statement by a customer while the customer is on the phone with a customer service agent. The customer may state "I am having internet connectivity issues" while on the phone with a company's IT help desk personnel. As another example, the service request data may include all the information provided by a user via service request fields displayed by an online service request interface. The service request interface may include fields corresponding to a location, the customer's name, the customer's address, and a date by which the request is to be completed. As another example, a service request, submitted by a user, may include a screen shot of an error message displayed by an application.

Either or both of the client application 102 or SR processing application 106 may augment a service request 104, submitted by a user, with additional service request data. Examples may refer to one of the client application 102 or the SR processing application 106, however, the operations may be executed by the other of the client application 102 or the SR processing application 106. The client application 102 may augment a service request 104 with information identifying a request submitter, an environment, or a context associated with the service request. As an example, a client application 102, executed by a user, may generate the service request 104. The client application may add information to a customer request, prior to presenting the SR to an agent. The information may include information about the environment in which the client application is executing, a time at which the service request was submitted, and/or customer that submitted the service request.

A SR processing application may augment a service request 104 with agent notes. An agent may add a note specifying the status of the service request. As an example, an agent analyzes a service request. The agent adds a note, "I reset the router but it did not resolve the internet connectivity issue." An agent may mark the service request based on urgency, e.g., "urgent," or "expedited." The agent ceases work on the service request. The next day, a new agent opens the service request and picks up where the previous agent left off. The new agent may now be attempting to process a service request related to internet connectivity issues that were not fixed by resetting the router.

A service request 104 may be a combination of two or more initial service requests. As an example, a customer submitted two separate service requests related to a loss of internet connectivity. The two service requests are combined into a single service request to be presented to an agent.

In an embodiment, the client application 102 generates the service request 104. The client application 102 may be a local application or an online application. Examples of client applications include online banking applications, word processing applications, and business management applications. The client application 102 is communicatively coupled to the SR processing application 106. The client application includes functionality to transmit the service request 104 to the SR processing application 106.

The client application 102 may be used to generate a service request 104 related to an issue with the client application itself. As an example, when the client application 102 experiences an error, the client application presents an interface. A user of the client application 102 submits a service request via the interface. Alternatively, or additionally, the client application 102 may be used to generate a service request for an issue that is not related to the client application. As an example, an employee uses a business management application to submit a service request to have the air conditioning in his office repaired.

In an embodiment, the SR processing application 106 is an application for presenting and processing the service request 104. The SR processing application 106 may receive service requests 104 from the client application 102 when the client application 102 pushes the service requests 104 to the SR processing application 106. The SR processing application may generate a data object corresponding to a service request based on information received from a user. As an example, the SR processing application may integrate with an audio application. The SR processing application populates a service request template based on a user's verbal statements. The SR processing application may, for example, populate a "problem" field, and a customer account field. The SR processing application 106 may present the service request 104 (including service request data thereof) to an SR processing agent (referred to herein as an "agent"). As noted above, the SR processing application 106 may present service requests that have been augmented with additional information.

In an embodiment, the SR processing application 106 includes a User Interface (UI). The UI displays information and accepts input. The SR may include a Graphical User Interface (GUI). The GUI may include buttons, fields, check boxes, drop down menus, and other graphical components. A SR processing agent may interact with the graphical components of the GUI to obtain information or provide input. As an example, the GUI displays a button, which, when clicked by a user, generates a pop-up window. The pop-up window displays a set of fields to accept input from a SR processing agent.

In one or more embodiments, the SR processing application 106 implements application features 108. An application feature 108 is a feature for executing a particular task in relation to a service request. The application feature 108 may be associated with an interface element of the SR processing application 106. The interface element may, for example, be a button, an icon, a link, a toolbar, or a toolbar component. An application feature 108 may be used to execute tasks such as resetting a router or ordering goods and services. The application feature 108 may be a module for executing the task. The application feature 108 may link to a module for executing the task. The application feature 108 may be a link to an on-line tool used in processing the service request.

In an embodiment, the application feature 108 is a toolbar. A toolbar is an interface for executing a SR-related task. A toolbar may include buttons marked with labels to activate a function of an application. A toolbar may include additional input and/or output elements, such as drop-down menus and text boxes. The toolbar may be presented via an interface of the service request processing application 106. As an example, the SR processing application includes a toolbar labeled "Escalate Claim." When a user clicks on the toolbar, the SR processing application 106 generates a pop-up window including a form for the user to fill out to escalate a claim.

In an embodiment, the application feature 108 is a functionality of the SR processing application 106. The application feature 108 may be a module within the SR processing application. As an example, the application feature 108 is a module, within the SR processing application, which can be used to book a travel reservation.

Figure 2:
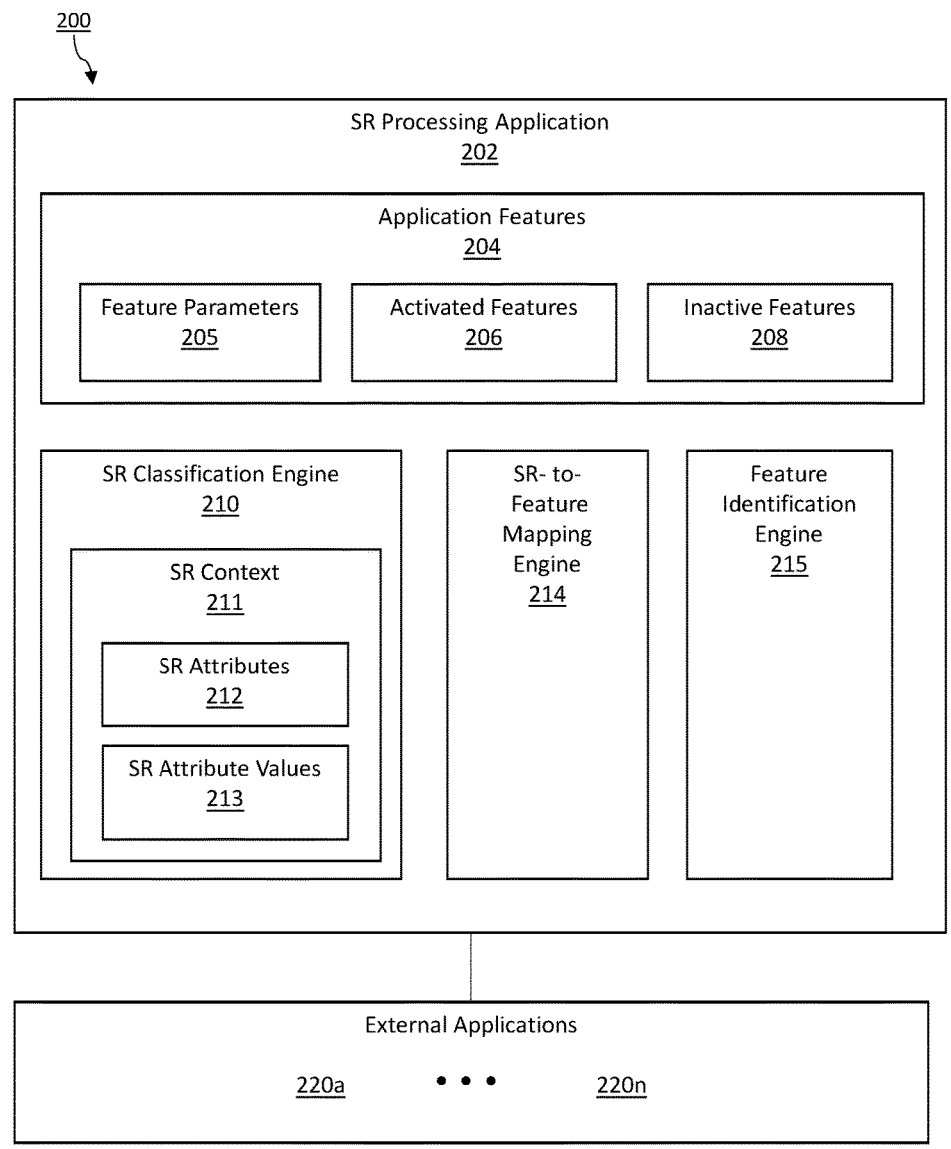
FIG. 2 illustrates a system for activating application features based on a service request in accordance with one or more embodiments.

FIG. 2 illustrates a system 200 for activating application features based on a service request in accordance with one or more embodiments. The system 200 includes an SR processing application 202 linked to external applications 220a . . . 220n. In one or more embodiments, the system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

In one or more embodiments, the SR processing application 202 includes the capabilities of the SR processing application 106 in FIG. 1. Additionally, the SR processing application 202 includes hardware and/or software configured to selectively activate application features 204. The SR processing application 202 includes an SR classification engine 210, SR-to-feature mapping engine 214, and feature identification engine 215.

In an embodiment, the SR processing application 202 includes hardware and/or software configured to activate the application features 204. The SR processing application 202 may activate one or more application features 204 by presenting interface components corresponding to the application features. The SR processing application 106 may activate an application feature by rendering a toolbar. The SR processing application 106 may activate an application feature by granting access to the application feature. The SR processing application 202 selectively activates application features based on service request context as describe below with reference to FIG. 3.

In one or more embodiments, the external applications (e.g., external applications 220a . . . 220n) are applications with functionality that is useful for processing a service request. An external application may include a module for executing a task for a specific type of service request. As examples, an external application may include functionality to order office supplies or schedule maintenance. The external applications are communicatively coupled to the SR processing application 202. A module of an external application may be activated via user interaction with an application feature 204 presented on an interface of the SR processing application 202.

In one or more embodiments, the application features 204 include the capabilities of the application features 108 described with respect to FIG. 1. Additionally, an application feature 204 may be an access link to an external application (e.g. external applications 220a . . . 220n). The application feature 108 may be a link to a module within an external application. As an example, an application feature 204 is an access link to a module, of online retailing application, for initiating a return.

In an embodiment, the feature parameters 205 are parameters accepted by an application feature 204. The application feature 204 may accept, as input, values corresponding to one or more feature parameters 205. As an example, the application feature includes interface components configured to receive values for the feature parameters Item, Quantity, and Address. One or more operations may be executed based on the feature parameters 205. As an example, the application feature links to a module for generating an order to send items to an address, based on value corresponding to the feature parameters. Metadata associated with a particular application feature may specify the feature parameters 205 associated with the application feature 204.

In an embodiment, the activated features 206 are application features 204 to be activated for resolving a particular service request. The activated features 206 may be features that the SR processing application 202 has determined are relevant to a particular service request.

In an embodiment, the inactive features 208 are application features that are not to be activated for resolving a particular service request. The inactive features 208 may be features which the SR processing application 202 has determined are not relevant to a particular service request. As an example, the SR processing application 202 displays a service request for repairing a computer monitor. Internet connectivity is likely not related to repairing a computer monitor. Accordingly, the SR processing application 202 does not activate application features related to improving internet connectivity when the SR processing application 202 is displaying the service request for repairing a computer monitor.

In an embodiment, the SR attributes 212 are fields or data types in a service request 104. A particular type of service request may be associated with a set of parameters necessary to process the service request. As an example, for a travel-related service request, the service request attributes include start date and end date. As another example, for an internet-connectivity-related service request, the service request attributes include server identification number and server uptime status. A particular service request may include from one SR attribute, up to thousands of SR attributes.

In an embodiment, an SR attribute value 213 (also referred to herein as a "value") is a value corresponding to a particular SR attribute 212. SR attribute values may also be referred to herein as "service request data." As an example, the number 388999 is an SR attribute value corresponding to the SR attribute User ID. An SR attribute value 213 may be a textual string, such as a name or city. An SR attribute value 213 may be a numeric value, such as an identification number or date.

In an embodiment, the SR context 211 is a context associated with a service request. The SR context may define a type of service request and/or characteristics of a service request, based on SR data associated with the service request. The SR context 211 is defined by a set of service request attributes 212 corresponding to the service request 104. The SR context 211 may be determined based on SR attribute values 213 included in the service request 104. As an example, a service request includes the words "Wi-Fi" and "slow." Based on the words "Wi-Fi" and "slow", an SR application may determine that the context of the service request to be Wi-Fi issues.

In an embodiment, the SR classification engine 210 includes hardware and/or software configured to identify SR attributes 212 and SR attribute values 213 by analyzing a service request 104. The SR classification engine 210 may extract data from a service request 104 for classification. Based on the extracted data, the SR classification generate a vector of SR data.

In an embodiment, the SR classification engine 210 includes software and/or hardware configured to determine SR attributes 212 and/or SR attribute values 213, based on the extracted SR data. The SR classification engine 210 may identify a value extracted from the SR data based on a format. For example, SR classification engine 210 may classify a set of numbers as a social security number based on a display format of the extracted number (e.g., XXX-XX-XXXX). Accordingly, the SR classification engine determines that the value corresponds to the SR attribute SSN. The SR classification engine 210 may determine SR attributes and/or attribute values based on contextual information. As an example, a service request includes the text: "The end date of my stay is 1/12/18." Based on the proximity of the date to the text "check out date", SR classification engine 210 determines that the value 1/12/18 corresponds to the service request attribute HotelCheckoutDate.

In an embodiment, the SR-to-feature mapping engine 214 includes hardware and/or software configured to map SR attributes 212 to feature parameters 205 which are mapped to one or more application features. SR attributes of an SR may map to one or more corresponding feature parameters of an application feature. As an example, a service request includes the SR attributes product, issue text, customer, customer ID, data center, server ID, database, and URL. Application feature X accepts the feature parameters product, issue text, and customer. The SR-to-feature mapping engine 214 determines that three SR attributes of the SR map to three corresponding feature parameters accepted by application feature X.

The SR-to-feature mapping engine 214 may map SR values to application features. In an embodiment, the SR-to-feature mapping engine 214 may use a keyword set associated with an application feature. As an example, "Wi-Fi" may be keyword associated with an application feature Z used for resetting a router. Any SR that includes "Wi-Fi" may be mapped to the application feature Z.

In an embodiment, the feature identification engine 215 includes hardware and/or software configured to select application features to activate, based on the service request. The feature identification engine may select application features, based, at least in part, on the SR-to feature mapping. The feature identification engine may use a heuristic machine-learning model to select application features based on factors such as prior use of the features.

In an embodiment, the feature identification engine 215 includes hardware and/or software configured to identify a set of available application features. The feature identification engine 215 may query an application feature repository to identify a set of published application features. The feature identification engine may determine feature parameters 205, of a particular feature, based on metadata associated with a particular feature. As an example, the feature identification engine 215 identifies, based on metadata associated with a particular feature, that the feature requires, as input, the feature parameters Customer ID, IP Address, and Failure Status.

In an embodiment, the feature identification engine 215 includes hardware and/or software configured to select application features for activation. The feature identification engine 215 may determine feature parameters 205 that map to SR attributes 212 of a particular SR. The feature identification engine 215 may activate application features that correlate with the feature parameters 205 that map to the SR attributes 212.

In an embodiment, the feature identification engine 215 includes hardware and/or software configured to detect environmental characteristics of the SR processing application 106 or the client application 102. The environmental characteristics may include hardware and/or software installed on a device executing the SR processing application 202 or the client application 102. The feature identification engine 215 may determine applicable application features to activate, based on the environment. As an example, the feature identification engine 215 determines that the SR processing application 202 is executing on a computer which does not include a word processing application. Accordingly, the feature identification engine 215 refrains from selecting any features that require a word processing application to function.

3. Selectively Activating Application Features

Figure 3:
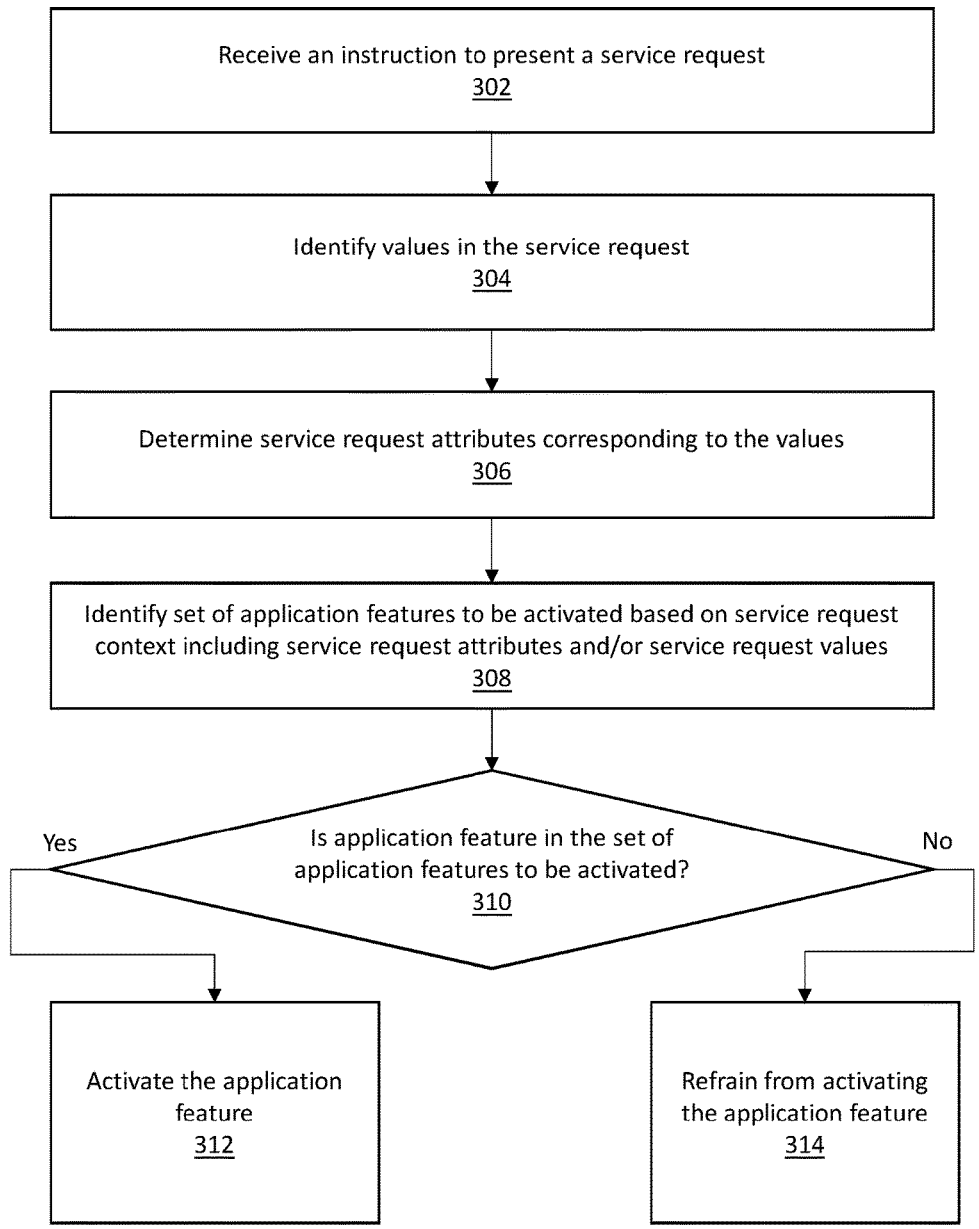
FIG. 3 illustrates an example set of operations for selectively activating application features in accordance with one or more embodiments.

FIG. 3 illustrates an example set of operations for selectively activating application features in accordance with one or more embodiments. One or more operations illustrated in FIG. 3 may be modified, rearranged, or omitted altogether. Accordingly, the particular sequence of operations illustrated in FIG. 3 should not be construed as limiting the scope of one or more embodiments.

In an embodiment, the SR processing application receives an instruction to present a service request (Operation 302). The SR processing application may receive the instruction to present the service request in real-time as a user generates the service request via the client application. Alternatively, or additionally, an agent may select a stored service request to be processed using the SR processing application. As an example, an agent logs in to the SR processing application at the start of the agent's shift. The agent selects a service request from a que of outstanding service requests.

Figure 4A:
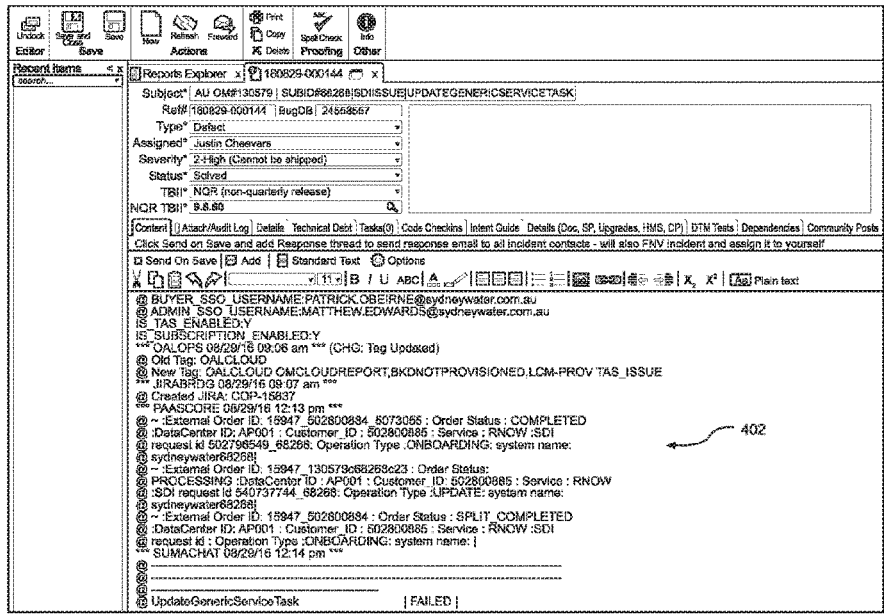
FIG. 4A illustrates an example service request processing application interface in accordance with one or more embodiments.

The SR processing application may present the service request by presenting service request data. The SR processing application may present service request data via a user interface of the SR processing application, as shown in FIG. 4A.

In an embodiment, the SR classification engine extracts service request data. The SR classification engine may extract all service request data from the service request. Alternatively, the SR classification engine may extract a subset of service request data from the service request. The SR classification engine may generate a vector comprising the service request data.

In an embodiment, the SR classification engine identifies values in the service request (Operation 304). The SR classification engine classifies values as corresponding to respective SR attributes (Operation 306). The SR classification engine may identify values in the service request based on delimiters (for example, commas or spaces). As an example, the service request is received as a comma-separated list: 5/2/15, ordered vitamins, wrong vitamins received, 78987966, 5/5/15. The SR classification engine recognizes 5/2/15, ordered vitamins, wrong vitamins received, 78987966, and 5/5/15 as SR attribute values. The SR classification engine may determine that a value corresponds to a particular SR attribute based on a format of the value matching the format for the particular SR attribute. As an example, the SR classification engine identifies a value in a format: Number Number '/' Number Number '/' Number Number Number Number (##/##/####). Based on the format of the value, the SR classification engine determines that the value is a date which has a format ##/##/####.

The SR classification engine may identify values in the SR based on a structure or metadata associated with the SR data. As an example, the SR classification engine receives an SR including structured data. The name "John Smith" is associated with a field corresponding to a metadata tag name. The SR classification engine determines that the value John Smith corresponds to the SR attribute name.

The SR classification engine may generate an SR attribute vector comprising SR attributes associated with the service request. As an example, a service request includes 100 attributes. The SR classification engine generates a vector, S, including the 100 attributes, $a_i$: $S=(a_1, a_2, \ldots a_{100})$. The SR attribute vector may be an N-dimensional vector, with N increasing with the complexity of the service request.

A service request context, as referred to herein, includes one or more of: SR values and SR attributes corresponding to SR values. The service request context may further include a category or any other information which may be useful for classifying a SR.

In an embodiment, the feature identification engine identifies a set of application features to be activated (Operation 308). The feature identification engine may identify the set of application features to be activated based on the service request context. Based on the determined SR attributes and SR attribute values, the feature identification engine identifies application features which may be useful for processing the service request. As an example, the service request data includes text "my laptop is not charging". The SR attribute values "charging" and "laptop" are extracted from the SR.

Based on the SR attribute values, the feature identification engine determines that "charging" and "laptop" are keywords associated with an application feature "battery-order." "Battery-order" is a one-click application feature which allows a SR processing agent to order batteries using a single click. The one-click application feature uses a stored payment method, and the information for a user's registered laptop to complete the order. The feature identification engine identifies the "battery-order" application for activation.

In an embodiment, an application feature may be selected based on analysis of available application features. The feature identification engine may identify the installed modules of the SR processing application as a set of available application features. Alternatively, or additionally, the feature identification engine may query an application feature database to identify a set of available application features. An available application feature may rely on an external application for execution of a particular task.

In an embodiment, the feature identification engine obtains metadata corresponding to each feature, of the set of available application features. The feature identification engine may use the application feature metadata to determine sets of feature parameters corresponding to each of the application features. The SR-to-feature mapping engine maps SR attributes to each set of feature parameters to identify sets of feature parameters with a high level of correlation to the SR attributes.

As an example, the SR-to-feature mapping engine compares the SR attribute vector $S=(a_1, a_2, a_3, a_4, a_5, a_6, a_7)$ to a set of 50 available application feature vectors $F_i$. The application feature vectors include $F_1=(a_1, a_3, a_5, a_{16})$. The SR-to-feature mapping engine determines that 4 feature parameters of $F_1$ map to corresponding SR attributes in S ($a_1$, $a_3$, and $a_5$). It should be understood that a feature parameter may be mapped to an SR attribute even if a label associated with a feature parameter and a label associated with the SR attribute are different. As an example, the SR-to-feature mapping engine may determine that the SR attribute Customer ID Number maps to the feature parameter Cust. ID.

In an embodiment, the feature identification engine selects one or more application features for activation, based on the mapping. The feature identification engine may select an application feature if all SR attributes of the service request map to corresponding feature parameters of the application feature. Alternatively, the feature identification engine may select an application feature if a number or percentage of SR attributes of the service request map to feature parameters of the application feature. As an example, the feature identification engine selects an application feature if 80% of SR attributes of the service request map to feature parameters of the application feature. As another example, the feature identification engine selects an application feature if 70% of the corresponding set of feature parameters match the SR attributes of the SR.

Alternatively, or additionally, the feature identification engine may select application features for activation using a machine-learning model, as described in Section 4. The feature identification engine may select application features for activation based, at least in part, on a stored weight corresponding to an application feature. The weight may be based on a number of models that the application feature maps to, and/or prior use of the feature, as detailed in Section 4.

In an embodiment, the feature identification engine identifies an application feature for activation based on an execution environment associated with the service request. The feature identification engine may identify an execution environment associated with the service request by querying a device executing the SR processing application and/or the client application. The feature identification engine may select a subset of application features, based on a compatibility between the execution environment and the feature. The feature identification engine may select features based on the execution environment including an installed application. As an example, an application feature requires a spreadsheet application to execute. Upon determining that the execution environment does not include a spreadsheet application, the system does not activate the feature. The feature identification engine may select features based on a setting. As an example, an application feature generates a pop-up via the client application. If a setting of the client application disables pop-ups, then the feature identification engine does not select the feature for activation.

In an embodiment, the feature identification engine identifies an application feature for activation based on a user having access to the application feature. The feature identification engine may determine whether a user has access to a particular feature by determining an access policy of a particular application feature. As an example, a particular application feature may not be available to agents operating outside of a particular company. Accordingly, the feature identification engine may refrain from selecting the particular application feature for presentation to an agent operating outside of the particular company.

In an embodiment, the feature identification engine determines whether a particular application feature is in the set of application features to be activated (Operation 310). The feature identification engine may compare a particular application feature to the set of application features selected for activation. Based on the comparison, the feature identification engine may determine if the particular application feature is included in the set.

In an embodiment, if the application feature is in the set of application features to be activated, then the SR processing application activates the application feature (Operation 312). The SR processing application may activate the application feature by presenting an interface element corresponding to the application feature. The SR processing application may activate the application feature by rendering a toolbar or link on the SR processing application UI.

The SR processing application may activate an application feature by removing access restrictions corresponding to an application feature. The SR processing application may activate an application feature by improving a speed or efficiency with which an agent can access the application feature. The system may activate the application feature by enabling a functionality of the SR processing application. As an example, the application feature includes 100 modules for processing different types of SRs. The modules are generally in an inactive state. The SR processing application activates a selected feature so that the selected feature can be used.

In an embodiment, the SR processing application activates an application feature by presenting an access link to an application feature of an external application. The SR processing application may identify an external system associated with the feature to be activated. The system may enable the SR processing application to access to the application features corresponding to the external system.

In an embodiment, the SR processing application activates a set of application features by displaying the application features in a ranked order. The ranked order may be based on a prior usage of each of the application features in the set. Alternatively, or additionally, the ranked order may be based on a relevance of each of the application features to the service request. As an example, three application features are selected for activation for a particular SR. Four SR attributes of the SR map to feature parameters of a first application feature, $F_1$. Three SR attributes map to feature parameters of a second application feature, $F_2$. Two SR attributes map to feature parameters of a third application feature, $F_3$. The SR processing application displays the application features in ranked order, based on the number of feature parameters that map to SR attributes: $F_1|F_2|F_3$.

In an embodiment, the SR processing application activates an application feature by instantiating the application feature with values. The SR processing application may activate the application feature with values so that the application feature can execute without additional intervention from a user. As an example, the SR processing application activates an application feature. The application feature is for placing an order using the input feature parameter vector (Product, Datacenter, Database, Customer ID, and Order ID). The SR processing application instantiates the application feature with the SR attribute values (paper, Cloud.PC8000, PaperCo Cloud, 45678, 9101112), corresponding to each required SR attribute. When the application feature is selected by a user, the application feature places an order, using the attributes as obtained from the attribute vector.

In an embodiment, if the application feature is not in the set of application features to be activated, then the SR processing application refrains from activating the application feature (Operation 314). By not activating application features that are not pertinent to a given SR, the SR processing application enables a user to rapidly identify relevant application features.

The following detailed example illustrates operations in accordance with one or more embodiments. The following detailed example should not be construed as limiting the scope of any of the claims. An agent logs into the SR processing application. The agent opens a service request from a list of service requests. The service request was submitted by a customer via a webform and augmented with metadata. The service request is semi-structured:

Order ID: 89101112

Customer ID: 979293823749783

Timestamp 12.15.2016 08:00:01

URL Groceries.com

Issue: I ordered laundry detergent two weeks ago and have not received it. I would like a refund.

The SR classification engine extracts data from the service request. As SR data is extracted, the SR classification engine identifies service request attributes, and corresponding values, in the SR data. The SR classification engine generates a SR attribute vector, comprising the SR attributes identified in the SR. The SR attribute vector is: (Order ID, Customer ID, Sub ID, Timestamp, URL, Product, Issue Text, Request).

Based on the SR attribute vector, the system identifies features with feature parameters that map to one or more SR attributes. The system identifies application features $F_1$-$F_5$ listed in Table 1, below.

TABLE 1

| Feature parameters | Application Feature IDs |
|---|---|
| Product, Issue Text, Customer, Data Center, Server ID | $F_1$ |
| Product, Datacenter, Database, URL, Sub ID | $F_2$, $F_4$ |
| Customer ID, Order ID, OPC Data Center | $F_3$ |
| Product, Order ID, Request | $F_5$ |

$F_1$ is associated with the feature parameters Product, Issue Text, Customer, Data Center, and Server ID. For $F_1$, two feature parameters, Product and Issue Text, map to SR attributes of the SR. $F_2$ and $F_4$ are associated with the feature parameters Product, Datacenter, Database, URL, and Sub ID. For $F_1$ and $F_4$, three feature parameters, Sub ID, Product, and URL, map to SR attributes of the SR. $F_3$ is associated with the feature parameters Customer ID, Order ID, and OPC Data Center. For $F_3$, two feature parameters, Customer ID and Order ID, map to SR attributes of the SR. $F_5$ is associated with the feature parameters Product, Order ID, and Request. For $F_5$, three feature parameters, Product, Order ID, and Request, map to SR attributes of the SR.

The feature identification engine selects for activation three application features, of the five identified application features, that map to the highest number of SR attributes. $F_1$ maps to 2 SR attributes, $F_2$ maps to 3 SR attributes, $F_4$ maps to 3 SR attributes, and $F_5$ maps to 3 SR attributes. Accordingly, of the five application features, $F_2$, $F_4$, and $F_5$ map to the highest number of SR attributes. The feature identification engine selects $F_2$, $F_4$, and $F_5$ for activation.

TABLE 2

| Application Feature ID | Application Feature Display Name | Channels |
|---|---|---|
| $F_2$ | Log Search | Web |
| $F_4$ | GSI | Native |
| $F_5$ | SDI Access | Web |

Details about each selected application feature are shown in Table 2, above. The SR processing application presents the selected application features by displaying a set of toolbars. The SR processing application is rendered with toolbars corresponding to $F_2$, $F_4$, and $F_5$. The toolbars are displayed with the labels "Log Search," "GSI," and "SDI access," respectively.

The agent selects the GSI toolbar, corresponding to $F_4$. Responsive to the agent clicking on the GSI toolbar, the application feature transmits SR attribute values to an external application module linked to $F_4$. The external application module obtains details about the customer's order, and transmits the details to the GSI toolbar. The GSI toolbar displays the details to the agent.

4. Machine-Learning Model

In an embodiment, the system uses a heuristic machine-learning model to match a service request to one or more application features. The machine-learning model may be computed using an algorithm such as a decision tree or a support vector machine with dimensionality reduction. The model may be kept up-to-date by rebuilding the model as service requests are processed. The model may be rebuilt with a feedback loop and self-learning neural network.

The system may start with an empty data set and a simple keyword classifier with a bagging scheme to generate predictions over time. Alternatively, if a set of SR-to-feature mappings are available at an initial time, the system can feed the model at the initial time, using the set of mappings.

In an embodiment, the system generates attribute models using the machine-learning model. The system may analyze a set of service requests to identify inputs and outputs of the service requests. Based on the inputs and outputs of the service requests, the system generates models. Two models may have some, or all, attributes in common. As an example, five people have submitted service requests including the attributes source, destination, and departure date.

The system generates a model, $M_1$, to book air travel: (source, destination, departure date, trip duration)→Book Air Travel. The system generates another model, $M_2$, to book a hotel reservation: $M_2$: (destination, departure date, trip duration)→Book Hotel. The system may generate and store a plurality of models, each model corresponding to one or more service requests.

In an embodiment, the system updates the models over time. The system may delete models that are not used after a particular time period has elapsed. As an example, the system deletes a model if the model has not been used in six months. The system may alter a model as conditions change. As an example, a company uses a taxi service for local travel requests. The model for local travel requests is $M_3$: (source, destination, departure time)→Book Taxi. The company changes its local travel provider to a ride sharing application, Super. The model updates $M_3$ to (source, destination, departure time)→Book Super.

In an embodiment, the feature identification engine identifies one or more models, based on the SR attribute vector. The models may be selected based on a subset of the SR attribute vector. As an example, for a particular service request, the SR attribute vector includes 50 attributes. The SR attribute vector is $S=(a_1, a_2, \ldots a_{50})$. The feature identification engine identifies ten models $M_1$-$M_{10}$ which include at least one attribute of the SR attribute vector. The identified models include $M_1$: $(a_2, a_5, a_{22}, a_{33})\to O_1$ and $M_2$: $(a_1, a_2, a_{50})\to O_2$. $O_1$ and $O_2$ are the respective outputs of the models.

In an embodiment, the SR-to-feature mapping engine maps SR attributes of the models to corresponding feature parameters of the application features. The SR-to-feature mapping engine may identify a set of features $F_i$ with feature parameters which map to one or more SR attributes of a particular model. As an example, model $M_1$ accepts, as input parameters, the SR attributes $a_2$, $a_5$, $a_{22}$, and $a_{33}$. Feature $F_1$ accepts, as input parameters, the same attributes $a_2$, $a_5$, $a_{22}$, and $a_{33}$. Feature $F_2$ accepts, as input parameters, a subset of the attributes $a_2$, $a_{22}$, and $a_{33}$. Features $F_1$ and $F_2$ are both selected as application features with one or more feature parameters that map to corresponding SR attributes of $M_1$. If one or more SR attributes of a model map to one or more corresponding feature parameters of a particular application feature, then the model points to the application feature.

In an embodiment, the system ranks the application features based on a correlation with the models. The system may determine, for a particular application feature, a number of models that point to the application feature. The system may assign a weight, or ranking, to a feature based on the number of models that point to the application feature. As an example, 10 models point to a particular application feature, which indicates that the feature may be useful. Accordingly, the application feature is given a high weight value. Alternatively, or additionally, the system may assign a weight, or ranking, to a feature based on the number of SR attributes of a particular model which map to the feature. As an example, four feature parameters of application feature $F_1$ maps to corresponding SR attributes of $M_1$. Three feature parameters of application feature $F_2$ map to corresponding feature parameters of $M_1$. Accordingly, feature $F_1$ is weighted more heavily than feature $F_2$.

In an embodiment, the system increments or decrements the weight of the application features as the application features are used. The score of an application feature may be incremented each time an agent clicks on the feature. For example, two application features, $F_1$ and $F_2$, are activated. At the time of activation, $F_1$ and $F_2$ have weights based on the number of models that point to the features. $F_1$ has a weight of 2, and $F_2$ has a weight of 3. $F_2$ has a higher weight than $F_1$, as $F_2$ maps to more models than $F_1$. However, $F_2$ crashes frequently, and is not useful for agents. Agents repeatedly click on $F_1$. Each time an agent clicks on $F_1$, the score of $F_1$ is incremented by 0.1. After 10 uses, the score of $F_1$ is 3.

5. Example Embodiment—Service Request Toolbar

Figure 4B:
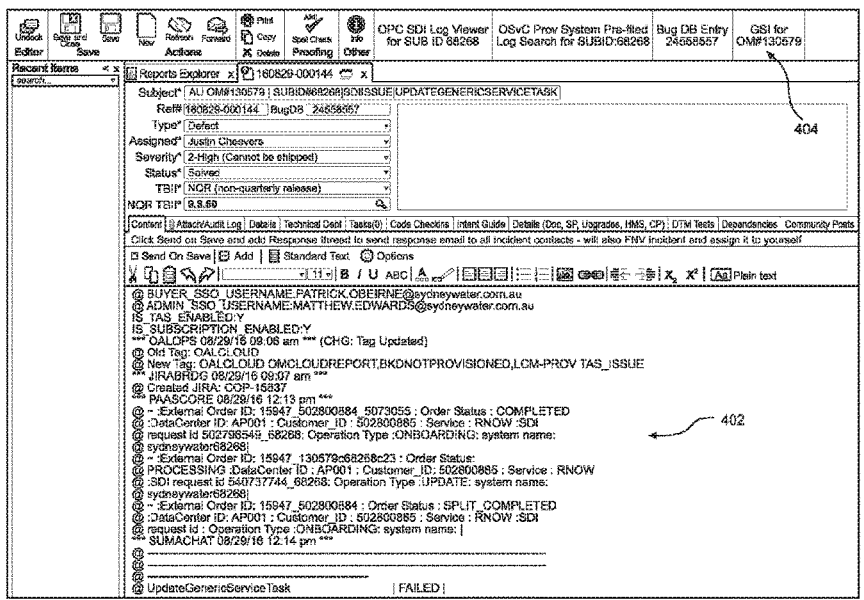
FIG. 4B illustrates an example service request processing application interface with application features in accordance with one or more embodiments.
Figure 4C:
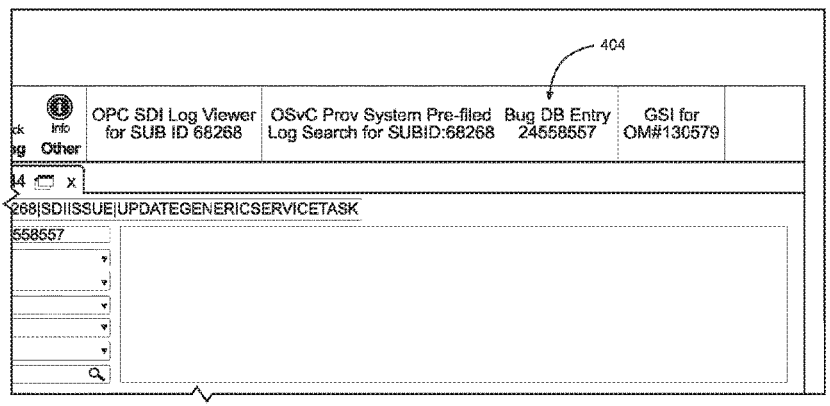
FIG. 4C illustrates a close-up view of the application features shown in FIG. 4B in accordance with one or more embodiments.

FIGS. 4A-4C illustrate example SR processing application UIs. One or more components of the SR processing application UIs as illustrated in FIGS. 4A-4C may be modified, rearranged, or omitted altogether. Accordingly, the components illustrated in FIGS. 4A-4C should not be construed as limiting the scope of one or more embodiments.

FIG. 4A illustrates a SR processing application UI 400, without activated application features, in accordance with one or more embodiments. The SR processing application UI 400 displays a service request 402. Because the service request UI does not include activated application features, an agent working on the service request would use an external browser and/or application to process the service request 402.

FIG. 4B illustrates a SR processing application UI 400, with four application features 404 activated as toolbars. The feature identification engine has selected four application features 404 for activation. The SR processing application has activated the four application features 404 by displaying each of the four application features as a toolbar. FIG. 4C illustrates a close-up view of the set of toolbars comprising the application features 404. Each application feature 404 links to a module of an external application for executing a specific task. Using the toolbars, the agent may easily locate and utilize useful application features for processing the service request 402.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
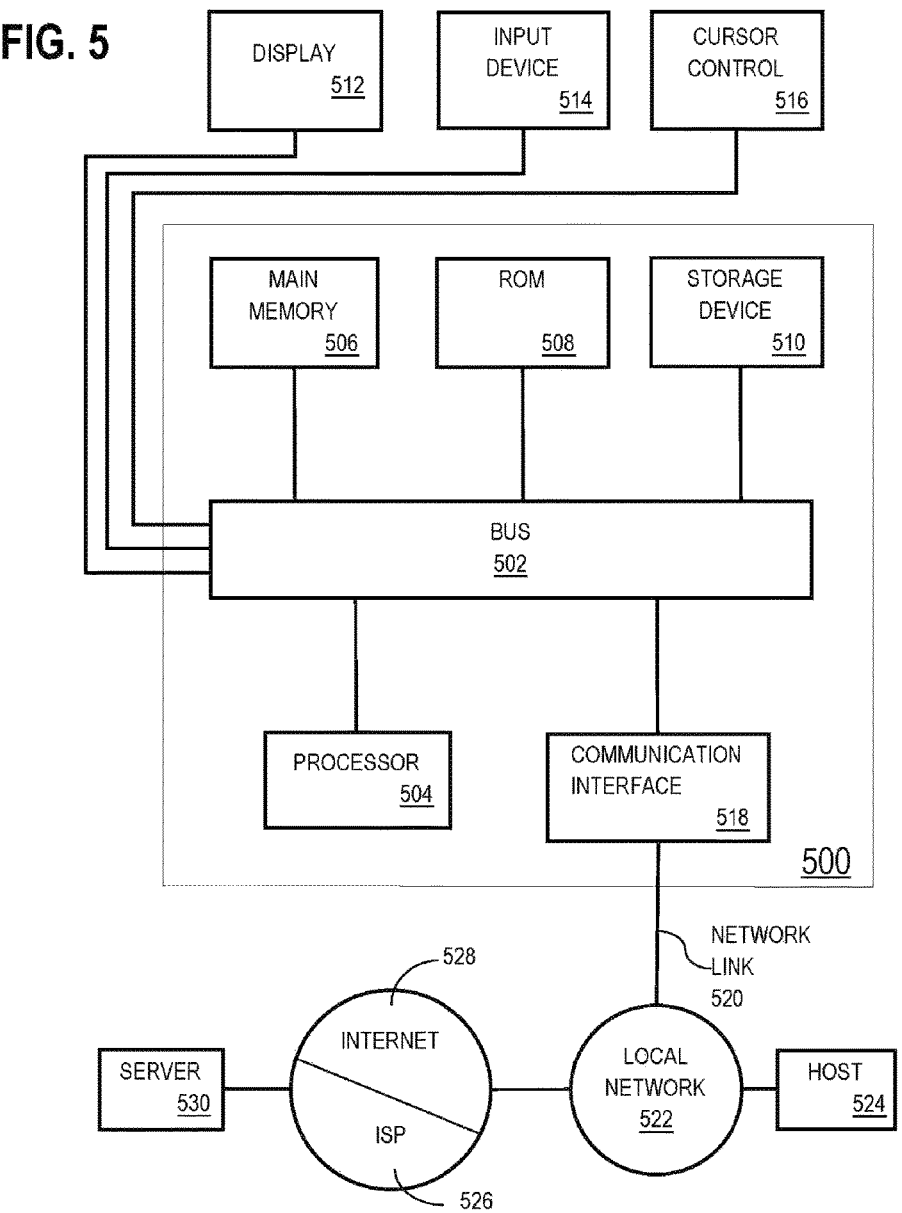
FIG. 5 illustrates a block diagram of a system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media include, for example, optical or magnetic disks, such as storage device 510. Volatile media include dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media are distinct from but may be used in conjunction with transmission media. Transmission media participate in transferring information between storage media. For example, transmission media include coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
  receiving, by an application, an instruction to present a service request;
  determining a service request context associated with the service request;
  identifying a first set of one or more application features, for processing the service request, that correspond to the service request context associated with the service request;
  identifying a second set of one or more application features that are not mapped to the service request context associated with the service request; and
  activating, by the application, the first set of application features without activating the second set of application features.

2. The medium of claim 1, wherein an application feature, of the first set of application features, is a functionality of the application.

3. The medium of claim 1, wherein an application feature, of the first set of application features, is an access link to an external system communicatively coupled to the application.

4. The medium of claim 1, wherein an application feature, of the first set of application features, is a toolbar.

5. The medium of claim 1, wherein the operations further comprise:
identifying a plurality of values in the service request; and
determining a plurality of service request attributes corresponding respectively to the plurality of values
wherein the service request context comprises at least one of: a value of the plurality of values, or a service request attribute of the plurality of service request attributes.

6. The medium of claim 5, wherein activating, by the application, the first set of application features comprises activating the application features based on the plurality of values.

7. The medium of claim 1, wherein activating, by an application, the first set of application features without activating to the second set of application features comprises:
presenting one or more interface components corresponding to the first set of application features without presenting any interface components corresponding to the second set of application features.

8. The medium of claim 1, wherein activating, by the application, the first set of application features comprises:
displaying the first set of application features in a ranked order based on a prior usage of each of the first set of application features.

9. The medium of claim 1, wherein activating, by the application, the first set of application features comprises:
displaying the first set of application features in a ranked order based on a relevance of each of the first set of application features to the service request.

10. The medium of claim 1, wherein activating, by the application, the first set of application features comprises:
identifying an external system necessary to process the service request;
identifying application features communicatively coupled to the external system; and
allowing the application access to the application features corresponding to the external system.

11. The medium of claim 1, wherein identifying the first set of one or more application features that correspond to the service request context associated with the service request comprises:
identifying service request data comprised in the service request;
determining that a correlation between the service request data and each of the first set of application features exceeds a threshold value;
determining that each of the first set of application features correspond to the service request context based on the correlation between the service request data and each of the first set of application features exceeding the threshold value.

12. The medium of claim 1, wherein the operations further comprise:
determining that service request attributes, comprised in the service request context, correspond to a plurality of attribute models;
determining a number of attribute models, of the plurality of attribute models, that are associated with a particular application feature;
activating or not activating the particular application feature based on the number of attribute models associated with the particular application feature.

13. The medium of claim 1, wherein the operations further comprise activating a particular application feature based at least on a prior usage of the particular application feature.

14. The medium of claim 1, wherein the operations further comprise activating a particular application feature based at least on an execution environment associated with the service request being associated with the particular application feature.

15. The medium of claim 1, wherein the operations further comprise activating a particular application feature based at least on a user having access to the particular application feature.

16. The medium of claim 1, wherein the application features, of the first set of application features, are identified using a machine-learning model.

17. The medium of claim 1, wherein the operations further comprise identifying a set of available application features, wherein the first set of application features is selected from the set of available application features.

18. The medium of claim 1, wherein the operations further comprise:
receiving, by the application, a second instruction to present a second service request; and
responsive to receiving the second instruction, modifying the first set of application features that have been activated, to a third set of application features that are selected based on the second service request.

19. A method comprising:
receiving, by an application, an instruction to present a service request;
determining a service request context associated with the service request;
identifying a first set of one or more application features, for processing the service request, that correspond to the service request context associated with the service request;
identifying a second set of one or more application features that are not mapped to the service request context associated with the service request; and
activating, by the application, the first set of application features without activating the second set of application features,
wherein the method is performed by at least one device including a hardware processor.

20. A system comprising:
at least one device including a hardware processor;
the system configured to perform operations comprising:
receiving, by an application, an instruction to present a service request;
determining a service request context associated with the service request;
identifying a first set of one or more application features, for processing the service request, that correspond to the service request context associated with the service request;
identifying a second set of one or more application features that are not mapped to the service request context associated with the service request; and
activating, by the application, the first set of application features without activating the second set of application features.

* * * * *